United States Patent
Shi

(10) Patent No.: US 10,215,906 B2
(45) Date of Patent: Feb. 26, 2019

(54) LIGHT GUIDE PLATE, BACKLIGHT MODULE, AND METHOD FOR MANUFACTURING LIGHT GUIDE PLATE

(71) Applicants: BOE TECHNOLOGY GROUP CO., LTD., Beijing (CN); HEFEI BOE DISPLAY LIGHTING CO., LTD., HeFei, Anhui (CN)

(72) Inventor: Zuchuan Shi, Beijing (CN)

(73) Assignees: BOE TECHNOLOGY GROUP CO., LTD., Beijing (CN); HEFEI BOE DISPLAY LIGHTING CO., LTD., Hefei, Anhui (CN)

(*) Notice: Subject to any disclaimer, the term of this patent is extended or adjusted under 35 U.S.C. 154(b) by 219 days.

(21) Appl. No.: 14/338,410

(22) Filed: Jul. 23, 2014

(65) Prior Publication Data
US 2015/0277016 A1    Oct. 1, 2015

(30) Foreign Application Priority Data

Mar. 28, 2014   (CN) .......................... 2014 1 0123109

(51) Int. Cl.
*F21V 8/00*         (2006.01)
(52) U.S. Cl.
CPC ......... *G02B 6/0043* (2013.01); *G02B 6/0041* (2013.01); *G02B 6/004* (2013.01);
(Continued)
(58) Field of Classification Search
CPC .. G02B 6/0033; G02B 6/0035; G02B 6/0036; G02B 6/004; G02B 6/0041;
(Continued)

(56) References Cited

U.S. PATENT DOCUMENTS 5,881,201 A * 3/1999 Khanarian ........... G02B 6/0041
                                                      385/146
5,899,552 A * 5/1999 Yokoyama .......... G02B 6/0038
                                                      349/62
(Continued)

FOREIGN PATENT DOCUMENTS

CN        2611920 Y      4/2004
CN        1786745 A      6/2006
(Continued)

OTHER PUBLICATIONS

First Office Action regarding Chinese application No. 201410123109.4, dated Jun. 30, 2015. Translation provided by Dragon Intellectual Property Law Firm.

*Primary Examiner* — Alexander K Garlen
*Assistant Examiner* — Colin J Cattanach
(74) *Attorney, Agent, or Firm* — Harness, Dickey & Pierce, P.L.C.

(57) ABSTRACT

The present invention provides a light guide plate, a backlight module, and a method for manufacturing the light guide plate. The light guide plate include a light guide plate body, on which at least two layers of dots having a refractive index different from the light guide plate body are distributed. According to the light guide plate of the present invention, the dots are distributed on at least two layers, rather than merely on a single interface as that in the traditional light guide plate. As a result, the dot density in an identical region of the light guide plate will exceed the limit of 100%, and thereby a better light guide effect will be achieved. In addition, according to the method of the present invention, the light guide plate is manufactured based on a 3D printing technology.

13 Claims, 6 Drawing Sheets

(52) U.S. Cl.
CPC .......... *G02B 6/0033* (2013.01); *G02B 6/0035* (2013.01); *G02B 6/0036* (2013.01); *G02B 6/0051* (2013.01); *G02B 6/0053* (2013.01); *G02B 6/0063* (2013.01)

(58) Field of Classification Search
CPC .. G02B 6/0043; G02B 6/0051; G02B 6/0053; G02B 6/0063
See application file for complete search history.

(56) References Cited

U.S. PATENT DOCUMENTS

| | | | | |
|---|---|---|---|---|
| 5,901,266 | A * | 5/1999 | Whitehead | G02B 6/001 385/132 |
| 6,480,307 | B1 * | 11/2002 | Yang | G02B 5/0215 349/65 |
| 8,033,706 | B1 * | 10/2011 | Kelly | G02B 6/0036 362/307 |
| 8,430,548 | B1 * | 4/2013 | Kelly | G02B 5/0242 362/606 |
| 8,840,746 | B2 | 9/2014 | Kanade | B29D 11/0073 156/242 |
| 8,876,354 | B2 * | 11/2014 | Kanade | G02B 6/001 362/615 |
| 8,998,477 | B2 * | 4/2015 | Kanade | G03B 15/02 362/600 |
| 9,128,220 | B2 * | 9/2015 | Ochi | G02B 6/0033 |
| 2003/0210222 | A1 * | 11/2003 | Ogiwara | G02B 6/0036 345/103 |
| 2004/0135494 | A1 * | 7/2004 | Miyatake | G02B 5/3008 313/501 |
| 2006/0056166 | A1 * | 3/2006 | Yeo | G02B 6/0041 362/19 |
| 2006/0120110 | A1 * | 6/2006 | Lin | G02B 6/0036 362/615 |
| 2006/0146573 | A1 * | 7/2006 | Iwauchi | G02B 6/0018 362/621 |
| 2006/0227546 | A1 * | 10/2006 | Yeo | G02B 5/0242 362/227 |
| 2006/0250567 | A1 * | 11/2006 | Yu | G02B 5/3008 349/181 |
| 2008/0043490 | A1 * | 2/2008 | Coleman | G02B 6/0036 362/623 |
| 2008/0044564 | A1 * | 2/2008 | Kanade | B29D 11/0073 427/203 |
| 2008/0062718 | A1 * | 3/2008 | Liao | F21V 7/04 362/615 |
| 2008/0068863 | A1 * | 3/2008 | Liao | G02B 6/0043 362/623 |
| 2008/0070998 | A1 * | 3/2008 | Takada | C08J 9/04 521/50.5 |
| 2009/0067178 | A1 * | 3/2009 | Huang | G02B 5/0242 362/326 |
| 2009/0103327 | A1 * | 4/2009 | Iwasaki | G02B 6/0046 362/617 |
| 2010/0170075 | A1 * | 7/2010 | Kanade | G02B 6/0041 29/428 |
| 2010/0195349 | A1 * | 8/2010 | Kanade | G02B 6/0046 362/607 |
| 2010/0246015 | A1 * | 9/2010 | Iwasaki | G02B 6/0041 359/599 |
| 2010/0246208 | A1 * | 9/2010 | Iwasaki | G02B 6/0041 362/582 |
| 2011/0234941 | A1 * | 9/2011 | Gourlay | G02B 6/0041 349/64 |
| 2012/0019743 | A1 * | 1/2012 | Chen | G02B 6/0055 349/65 |
| 2012/0026429 | A1 * | 2/2012 | Chen | G02B 6/004 349/65 |
| 2012/0026742 | A1 * | 2/2012 | Fang | G02B 6/0043 362/355 |
| 2012/0051092 | A1 * | 3/2012 | Kanade | G02B 6/001 362/629 |
| 2012/0294579 | A1 | 11/2012 | Chen | |
| 2013/0050831 | A1 * | 2/2013 | Hu | G02B 6/0041 359/599 |
| 2013/0114292 | A1 * | 5/2013 | Brick | G02B 6/0041 362/608 |
| 2013/0235614 | A1 * | 9/2013 | Wolk | G02B 6/005 362/607 |
| 2013/0242610 | A1 * | 9/2013 | Ochi | G02B 6/0033 362/611 |
| 2013/0242613 | A1 * | 9/2013 | Kurata | G02B 6/0035 362/613 |
| 2014/0192553 | A1 * | 7/2014 | Liu | G02B 6/0035 362/606 |
| 2014/0311570 | A1 * | 10/2014 | Raymond | H01L 31/0547 136/259 |
| 2015/0029749 | A1 * | 1/2015 | Laine | G02B 6/0036 362/608 |

FOREIGN PATENT DOCUMENTS

| | | | | |
|---|---|---|---|---|
| CN | 103135153 A | 6/2013 | | |
| CN | 103395207 A | 11/2013 | | |
| JP | 2009265200 A | 11/2009 | | |
| WO | WO 2014033686 A2 * | 3/2014 | | G02B 6/006 |

* cited by examiner

LIGHT GUIDE PLATE, BACKLIGHT MODULE, AND METHOD FOR MANUFACTURING LIGHT GUIDE PLATE

CROSS-REFERENCE TO RELATED APPLICATION

The present invention claims a priority of the Chinese patent application No. 201410123109.4, filed on Mar. 28, 2014 and entitled "light guide plate, backlight module, display device and method for manufacturing light guide plate", which is incorporated herein by reference in its entirety.

TECHNICAL FIELD

The present invention relates to the field of display technology, in particular to a light guide plate, a backlight module, and a method for manufacturing the light guide plate.

BACKGROUND

There are various methods for machining a traditional light guide plate, e.g., injection molding, dot printing after extrusion molding, dot hot-pressing after extrusion and laser dotting after extrusion. What is common to these methods is that the dots of the formed light guide plate are in an identical plane, i.e., the dots are all distributed on a bottom surface of the light guide plate.

FIG. 1 is a schematic view showing an existing light guide plate. As shown in FIG. 1, the dots of the light guide plate are concave ones. This light guide plate may be formed by injecting, hot-pressing or laser dotting. FIG. 2 is a schematic view showing another existing light guide plate. As shown in FIG. 2, the dots of the light guide plate are convex ones. This light guide plate may be formed by injecting, printing and hot-pressing.

The light guide plate is used to adjust the light by destroying total reflection with dots, and dot density is the most principal factor that will affect the adjustment capacity. The dot density refers to a ratio of an area of the dots to an area of the bottom surface of the light guide plate. In the prior art, because the dots are all distributed on the bottom surface of the light guide plate, there are limitations in the design mode of the dots. The dot density is unlikely to be greater than 100%, and the closer the dot density is to 100%, the harder the machining. In addition, a so-called "dot-connection" phenomenon will easily occur, and the adjustment effect of the light guide plate on the light will be affected. A travel distance of the light will increase along with an increase in the size of the light guide plate. In order to adjust the light at a long travel distance, the dot density is required to exceed the limit of 100%.

SUMMARY

An object of the present invention is to provide a light guide plate, a method for manufacturing the light guide plate, and a backlight module and a display device having the light guide plate. As compared with a traditional light guide plate, the dot density of the light guide plate of the present invention can be increased, thereby it is able to provide a better light adjustment effect.

In one aspect, the present invention provides a light guide plate including a light guide plate body, on which at least two layers of dots having a refractive index different from the light guide plate body are distributed.

Further, the light guide plate body includes a light-exiting surface, a bottom surface opposite to the light-exiting surface, and a light-entering surface adjacent to the light-exiting surface and the bottom surface.

Further, a plane on which each layer of dots is located is parallel to the light-exiting surface of the light guide plate body.

Further, the number of the dots gradually increases from a side close to the light-entering surface to a side away therefrom.

Further, the number of the dots gradually increases from a side close to the light-exiting surface to a side close to the bottom surface.

Further, a projection of the at least two layers of dots onto the bottom surface covers the entire bottom surface.

Further, the at least two layers of dots are arranged separately inside the light guide plate body, or at least one layer of the at least two layers of dots is distributed on the bottom surface of the light guide plate body.

Further, at least one layer of dots distributed on the bottom surface of the light guide plate body includes concave dots or convex dots.

In another aspect, the present invention provides a method for manufacturing the light guide plate based on a 3D printing technology, including:

according to a 3D model of the light guide plate and a series of bottom-up slices formed by decomposing the 3D model layer by layer, jetting, from the bottom up, a material corresponding to a currently-printed slice using a nozzle selected from at least two nozzles of a 3D printer and corresponding to the currently-printed slice, so as to perform the printing layer by layer, thereby to form a multilayered structure made of at least two materials.

The at least two materials have different refractive indices. The multilayered structure includes at least two layers of light guide plate bodies and at least two layers of dots, and the at least two layers of light guide plate bodies are connected together to form the light guide plate body of the light guide plate.

To be specific, the method includes:

according to the 3D model and the series of slices, jetting a first material using a first nozzle of the 3D printer and accumulating the first material to form a first layer of light guide plate body, a lower surface of the first layer of light guide plate body forming the bottom surface of the light guide plate body;

according to the 3D model and the series of slices, jetting a second material using a second nozzle of the 3D printer and accumulating the second material on an upper surface of the first layer of light guide plate body to form a first layer of dots, the first layer of dots including a plurality of dots distributed in an array form;

according to the 3D model and the series of slices, jetting the first material using the first nozzle of the 3D printer so as to cover gaps among the dots in the first layer of dots, and accumulating the first material to form a second layer of light guide plate body; and according to the step of forming the first layer of dots and the step of forming the second layer of light guide plate body, performing the printing layer by layer from the bottom up, so as to obtain several layers of light guide plate bodies and several layers of dots.

Further, the method includes:

according to the 3D model and the series of slices, jetting a second material using a second nozzle of the 3D printer, and accumulating the second material to form a first layer of dots, the first layer of dots including a plurality of dots distributed in an array form;

jetting a third material using a third nozzle of the 3D printer at the gaps among the dots in the first layer of dots, and accumulating the third material to form a support layer having an identical thickness to the first layer of dots;

according to the 3D model and the series of slices, jetting a first material using a first nozzle of the 3D printer, and accumulating the first material on an upper surface of a substrate formed by the first layer of dots and the support layer to form a first layer of light guide plate body, the lower surface of the first layer of light guide plate body being just the bottom surface of the light guide plate;

according to the 3D model and the series of slices, jetting the second material using the second nozzle of the 3D printer, and accumulating the second material on the upper surface of the first layer of light guide plate body to form a second layer of dots, the second layer of dots including a plurality of dots distributed in an array form;

according to the 3D model and the series of slices, jetting the first material using the first nozzle of the 3D printer to cover gaps among the dots in the second layer of dots, and accumulating the first material to form the second layer of light guide plate body;

according to the step of forming the second layer of dots and the step of forming the second layer of light guide plate body, performing the printing layer by layer from the bottom up, so as to obtain several layers of light guide plate bodies and several layers of dots; and removing the support layer.

Further, the third material includes paraffin. The step of removing the support layer includes heating and rinsing the support layer.

To be specific, the method includes:

according to the 3D model and the series of slices, jetting a second material using a second nozzle of the 3D printer, and accumulating the second material to form a first layer of dots, the first layer of dots including a plurality of dots distributed in an array form;

according to the 3D model and the series of slices, jetting a first material using a first nozzle of the 3D printer to cover the gaps among the dots in the first layer of dots, and accumulating the first material to form a first layer of light guide plate body;

according to the 3D model and the series of slices, jetting the second material using the second nozzle of the 3D printer, and accumulating the second material on the upper surface of the first layer of light guide plate body to form a second layer of dots; and according to the step of forming the second layer of dots and the step of forming the first layer of light guide plate body, performing the printing layer by layer from the bottom up, so as to obtain several layers of light guide plate bodies and several layers of dots.

In yet another aspect, the present invention provides a backlight module including the above-mentioned light guide plate.

In yet another aspect, the present invention provides a display device including the above-mentioned light guide plate or backlight module.

The present invention has the following advantageous effects. According to the light guide plate of the present invention, the dots are distributed on at least two layers, rather than merely on a single interface (the bottom surface) as that in the traditional light guide plate. As a result, the dot density in an identical region of the light guide plate will exceed the limit of 100%, and thereby a better light guide effect will be achieved.

In addition, according to the method of the present invention, the light guide plate is manufactured based on the 3D printing technology. As a result, it is able to manufacture the light guide plate without any molds, thereby to reduce the production cost.

DETAILED DESCRIPTION

Figure 1:
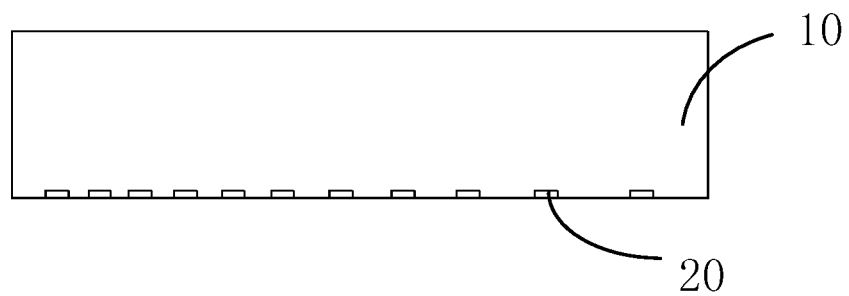
FIG. 1 is a schematic view showing an existing light guide plate.
Figure 2:
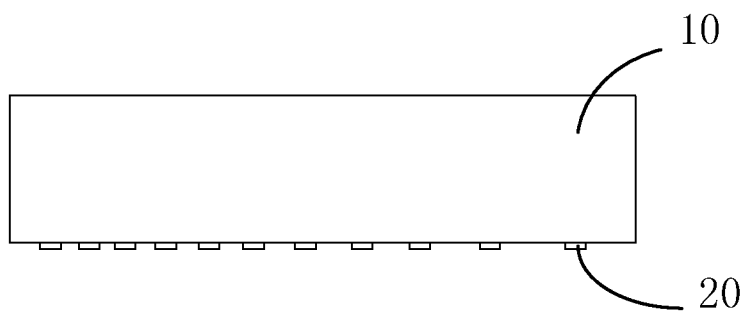
FIG. 2 is a schematic view showing another existing light guide plate.

The principle and features of the present invention will be described hereinafter referring to the drawings. The following embodiments are for illustrative purposes only, but shall not be used to limit the scope of the present invention.

Dots of an existing light guide plate are merely distributed on a single interface, so the dot density is limited and a light guide effect will be affected adversely. In order to overcome this drawback, the present invention provides a light guide plate which can achieve a better light guide effect than the traditional light guide plate.

Figure 3:
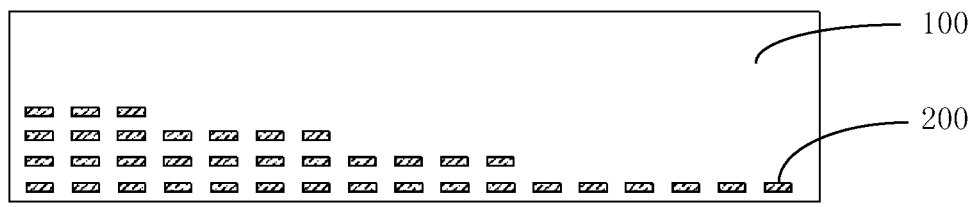
FIG. 3 is a schematic view showing a light guide plate according to the first embodiment of the present invention.
Figure 4:
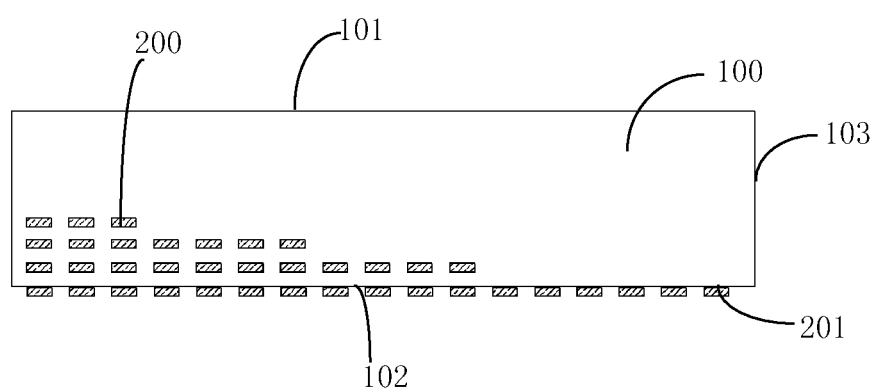
FIG. 4 is a schematic view showing the light guide plate according to the second embodiment of the present invention.
Figure 5:
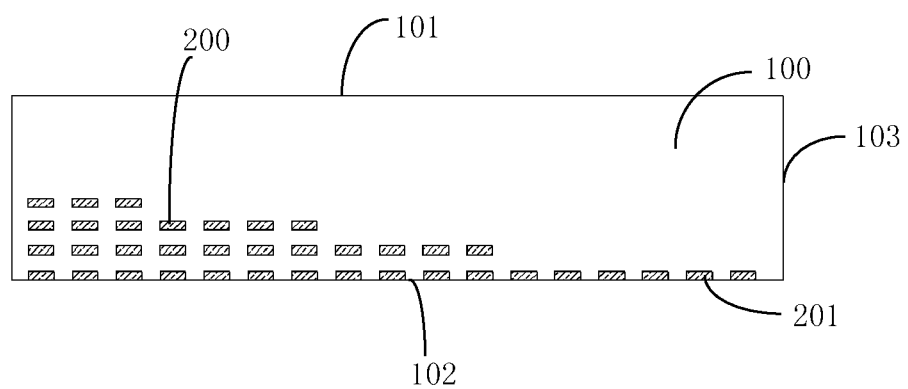
FIG. 5 is a schematic view showing the light guide plate according to the third embodiment of the present invention.

As shown in FIGS. 3-5, the light guide plate includes a light guide plate body 100, on which at least two layers of dots 200 having a refractive index different from the light guide plate body 100 are distributed.

In this embodiment, the dots 200 of the light guide plate are distributed on the light guide plate body 100 in at least two layers, i.e., the dots may be distributed on at least two interfaces parallel to a light-exiting surface. As a result, it is able to scatter the light at several interfaces, thereby to overcome the limitation that the dots 200 are merely distributed on a single interface (a bottom surface) as that in the traditional light guide plate and extend the design of the dots 200 for the light guide plate. As compared with the traditional light guide plate, the dot density in an identical region of the light guide plate can exceed a limit of 100%, thereby it is able to achieve a better light guide effect.

As shown in FIGS. 3-5, the light guide plate body 100 includes a light-exiting surface 101, a bottom surface 102 opposite to the light-exiting surface 101, and a light-entering surface 103 adjacent to the light-exiting surface 101 and the bottom surface 102. The light-entering surface 103 may be any surface adjacent to the light-exiting surface 101 and the bottom surface 102. In this way, the light guide plate of the present invention may be applied to an edge-type backlight module. The light may enter the light guide plate body 100 through the light-entering surface 103 of the light guide plate body 100, and exit from the light-exiting surface 101 after being scattered by the at least two layers of dots 200. Because the dots are distributed on at least two interfaces parallel to the light-exiting surface in at least two layers, the limitation that the dots are merely distributed on the bottom surface as that in the traditional edge-type light guide plate will be overcome, and the dot density in an identical region of the light guide plate can exceed the limit of 100%. As a result, it is able to achieve a better light guide effect.

Usually, in the light guide plate body 100, the light intensity will be gradually attenuated from a side adjacent to the light-entering surface 103 to a side away from a light-entering side. In order to ensure even light, preferably the number of the dots 200 gradually increases from the side adjacent to the light-entering surface 103 to the side away therefrom, as shown in FIGS. 3-5. In this way, there are more dots at the side away from the light-entering surface 103 than at the side adjacent thereto, and as a result, it is able to provide the even light from the light-exiting surface 101.

In addition, in a direction perpendicular to the light-exiting surface 101, the bigger the distance between the dots 200 and the light-exiting surface 101, the better the scattering of the light at the light-exiting surface, and the evener the light. So, in the present invention, preferably the number of the dots 200 gradually increases from a side adjacent to the light-exiting surface 101 to a side adjacent to the bottom surface 102 as shown in FIGS. 3-5. In other words, the layer with the biggest distance from the light-exiting surface 101 has the most dots 200, while the layer with the smallest distance from the light-exiting surface 101 has the least dots 200.

Figure 10:
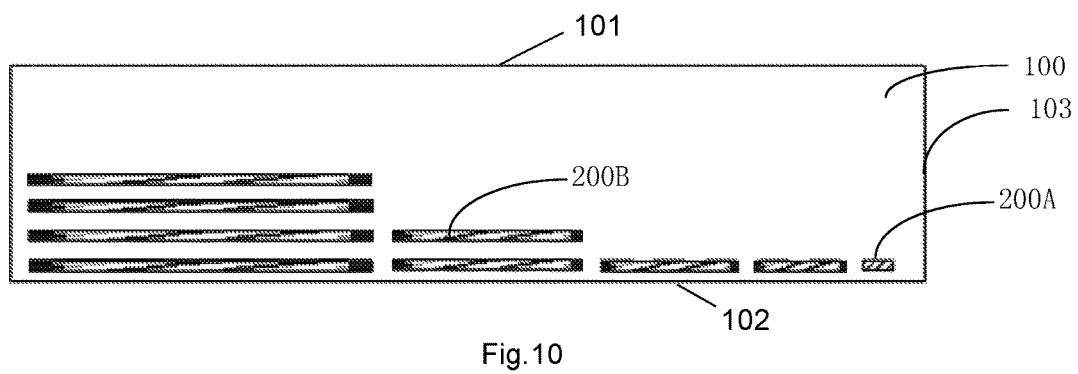
FIG. 10 is a schematic view showing a light guide plate where an area of a dot at the side adjacent to the light-entering surface is less than that of another dot at the side away therefrom.

It is to be noted that, as shown in FIGS. 3-5, the dots 200 at each layer are distributed at an equal interval, and the number of the dots 200 at the side closest to the light-entering surface 103 is less than the number of the dots 200 at the side furthest from the light-entering surface 103. The dot density at the side adjacent to the light-entering surface 103 is less than that at the side away therefrom, thereby it is able to provide the even light from the light-exiting surface 101. For actual application, the other ways may be used so that the dot density at the side adjacent to the light-entering surface 103 is less than at the side away therefrom. For example, as shown in FIG. 10, an area of the dots (e.q., the dot 200A) at the side adjacent to the light-entering surface 103 may be set as less than that of the dots (e.g., the dot 200B) at the side away therefrom. Alternatively, a gap between the dots 200 at the side adjacent to the light-entering surface 103 may be set as greater than that at the side away therefrom.

Figure 9:
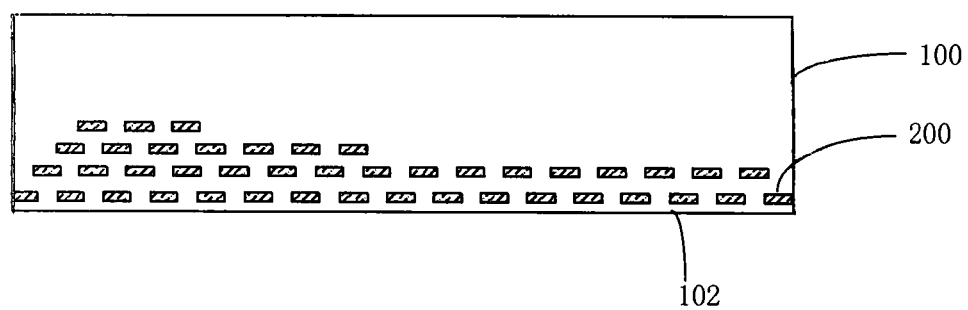
FIG. 9 is a schematic view showing a light guide plate where gaps among dots in two adjacent layers are distributed in a staggered manner.

In addition, in order to modulate the light in a better manner, as shown in FIG. 9, preferably a projection of the at least two layers of dots onto the bottom surface 102 covers the entire bottom surface 102. The gaps among the dots 200 in the two adjacent layers may be distributed in a staggered manner, so that the projection of the at least two layers of dots 200 onto the bottom surface 102 can cover the entire bottom surface 102. In this way, the light passing through the gaps of one layer of dots 200 will be scattered by the dots 200 on the other layer, and as a result, it is able to provide the even light.

In addition, it is to be noted that, the light guide plate body 100 of the present invention may be made of a hot-melt, transparent resin material, e.g., polymethyl methacrylate (PMMA) or polycarbonate (PC). The dots 200 may be made of a transparent, translucent or white hot-melt resin material, or a hot-melt resin material mixed with the other optical particles, e.g., PMMA mixed with $TiO_2$ particles. The effective refractive material (e.g., $TiO_2$ particles) in the material for the light guide plate body 100 has a refractive index different from that in the material for the dots 200. Due to the difference in the refractive index, the total reflection of the light in the light guide plate body 100 will be destroyed, and the light will exit from the light-exiting surface 101 of the light guide plate body 100.

Followings are several preferred embodiments for the light guide plate of the present invention.

First Embodiment

FIG. 3 is a schematic view showing a light guide plate according to the first embodiment of the present invention.

As shown in FIG. 3, the light guide plate includes a light guide plate body 100 and several layers of dots 200. The light guide plate body 100 includes a light-entering surface 103, a light-exiting surface 101 adjacent to the light-entering surface 103, and a bottom surface 102 opposite to the light-exiting surface 101. The layers of dots 200 are arranged within the light guide plate body 100, and a plane where each layer of dots is located is parallel to the light-exiting surface 101 of the light guide plate body 100. The dots 200 are made of a material having a refractive index different from the light guide plate body 100.

In addition, preferably, the number of the dots increases gradually from a side adjacent to the light-entering surface 103 to a side away therefrom. To be specific, among the layers of dots, a first layer of dots 201 with a minimum distance from the bottom surface 102 is distributed at a region corresponding to the entire bottom surface 102, while the other layers of dots at the side adjacent to the light-exiting surface 101 are merely distributed at the side away from the light-entering surface 103. Moreover, preferably, for the layers of dots within the light guide plate body 10, the number of dots 200 gradually decreases from a side adjacent to the bottom surface 102 to a side adjacent to the light-exiting surface 101.

According to the light guide plate of this embodiment, the dots are arranged within the light guide plate body in two layers. As compared with the traditional light guide plate where merely a layer of dots is arranged at the bottom surface, the dots are distributed on at least two interfaces parallel to the light-exiting surface in at least two layers, so the limitation that the dots are merely distributed on the bottom surface as that in the traditional edge-type light guide plate will be overcome, and the dot density in an identical region of the light guide plate can exceed the limit of 100%. As a result, it is able to achieve a better light guide effect. In addition, the bottom surface of the light guide plate of this embodiment may not be provided with dots, and the distance between the bottom surface and the layer of dots adjacent to the bottom surface may be adjusted in accordance with the practical need, so as to obtain a better optical effect. Moreover, it is able to make further improvements in the structure of the light guide plate, e.g., the planar bottom surface may cooperate with the other optical elements better, or the other optical structure may be arranged on the bottom surface.

Second Embodiment

FIG. 4 is a schematic view showing the light guide plate according to the second embodiment of the present invention.

As shown in FIG. 4, the light guide plate includes the light guide plate body 100 and several layers of dots 200. The light guide plate body 100 includes the light-entering surface 103, the light-exiting surface 101 adjacent to the light-entering surface 103, and the bottom surface 102 opposite to the light-exiting surface 101. At least one of the at least two layers of dots is distributed on the bottom surface 102 of the light guide plate body 100, and the plane where each layer of dots 200 is located is parallel to the light-exiting surface 101 of the light guide plate body 100. The dots 200 are made of a material having a refractive index different from the light guide plate body 100.

Preferably, for the layers of dots 200, the number of dots 200 increases gradually from the side adjacent to the light-entering surface 103 to the side away therefrom. To be specific, the first layer of dots 201 at the bottom surface 102 is distributed at the region corresponding to the entire bottom surface 102, while the layers of dots 200 within the light guide plate body 100 are merely distributed at the side away from the light-entering surface 103. Moreover, for the layers of dots 200 within the light guide plate 100, preferably, the number of dots 200 gradually decreases from the side adjacent to the bottom surface 102 to the side adjacent to the light-exiting surface 101.

In this embodiment, the first layer of dots 201 on the bottom surface 102 of the light guide plate body 100 includes convex dots.

According to the light guide plate of this embodiment, the dots are arranged in two layers. As compared with the traditional light guide plate where merely a layer of dots is arranged at the bottom surface, the dots are distributed on at least two interfaces parallel to the light-exiting surface in at least two layers, so the limitation that the dots are merely distributed on the bottom surface as that in the traditional edge-type light guide plate will be overcome, and the dot density in an identical region of the light guide plate can exceed the limit of 100%. As a result, it is able to achieve a better light guide effect. In addition, a layer of convex dots is arranged on the bottom surface of the light guide plate, and these dots are furthest from the light-exiting surface as compared with the dots within the light guide plate body, so it is able to provide the even light.

Third Embodiment

FIG. 5 is a schematic view showing the light guide plate according to the third embodiment of the present invention.

As shown in FIG. 5, this embodiment differs from the second embodiment merely in that the first layer of dots 201 on the bottom surface 102 of the light guide plate body 100 includes concave dots.

According to the light guide plate of this embodiment, the dots are arranged in two layers. As compared with the traditional light guide plate where merely a layer of dots is arranged at the bottom surface, the dots are distributed on at least two interfaces parallel to the light-exiting surface in at least two layers, so the limitation that the dots are merely distributed on the bottom surface as that in the traditional edge-type light guide plate will be overcome, and the dot density in an identical region of the light guide plate can exceed the limit of 100%. As a result, it is able to achieve a better light guide effect. In addition, a layer of concave dots is arranged on the bottom surface of the light guide plate, and these dots are furthest from the light-exiting surface as compared with the dots within the light guide plate body, so it is able to provide even light.

The above are the preferred embodiments of the light guide plate, and it should be appreciated that, the structure of the light guide plate is not limited to these embodiments in the actual application.

In another aspect, the present invention provides a method for manufacturing a light guide plate based on a 3D printing technology. This method may be used to manufacture the light guide plate of the present invention without any molds, and as a result, it is able to reduce the production cost.

Before the description of the method for manufacturing the light guide plate, the 3D printing technology will be described hereinafter, so as to facilitate the understanding of the present invention. For the 3D printing, as one of rapid phototyping technologies, a 3D model is established at first by modeling software, and then the established 3D model is decomposed into sections, i.e., slices, layer by layer, so as to instruct a printer to print these slices layer by layer. The printer reads information of the sections from a file, prints the sections layer by layer with a liquid, powder or sheet-like material, and then adheres these sections in various ways so as to form an entity. Currently, the 3D printing technology has been used to print the entity with a thermoplastic material, and the accuracy of lamination is up to 0.01 mm, so it can meet the requirements in a machining size of the dots 200 for the light guide plate.

The method of the present invention is just used to manufacture the light guide plate based on the 3D printing technology. As shown in FIG. 5, the method includes:
according to a 3D model of the light guide plate and a series of bottom-up slices formed by decomposing the 3D model layer by layer, jetting, from the bottom up, a material corresponding to a currently-printed slice using a nozzle selected from at least two nozzles of a 3D printer and corresponding to the currently-printed slice, so as to perform the printing layer by layer, thereby to form a multilayered structure made of at least two materials.

The at least two materials have different refractive indices. The multilayered structure includes at least two layers of light guide plate bodies and at least two layers of dots, and the at least two layers of light guide plate bodies are connected together to form the light guide plate body of the light guide plate.

The implementation of the method for manufacturing the light guide plate will be described hereinafter.

First Embodiment

The method of this embodiment may be used to manufacture the light guide plate according to the above first embodiment of the present invention.

Figure 6:
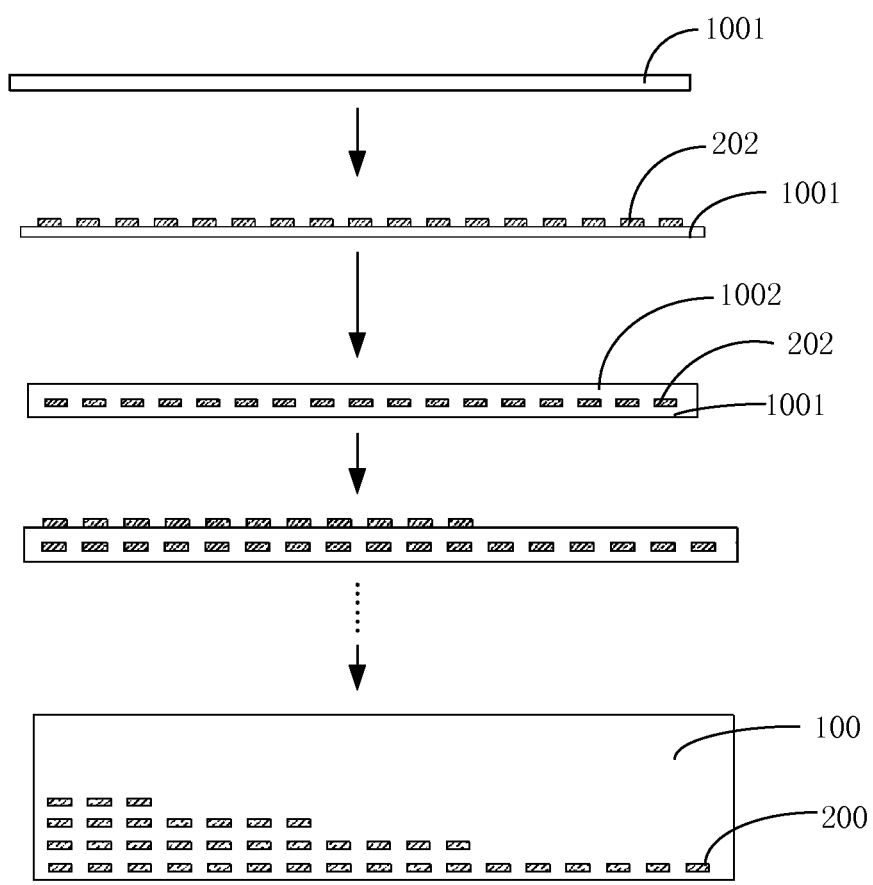
FIG. 6 is a flow chart of a method for manufacturing a light guide plate according to the first embodiment of the present invention.

As shown in FIG. 6, the method includes the following steps.

Step S01: generating a 3D model using a computer according to the structure of the light guide plate.

It is to be noted that, in Step S01, the structure of the light guide plate, including a 3D size of the entire light guide plate, the structure of each layer of light guide plate body and the structure of each layer of dots, is determined in the 3D model.

Step S02: decomposing the 3D model into a series of slices layer by layer from the bottom up.

It is to be noted that, in Step S02, the series of slices are used to instruct the 3D printer to accumulate a material layer by layer during the printing.

Step S03: according to the 3D model and the series of slices, jetting a first material on a support table using a first nozzle of the 3D printer, and accumulating the first material to form a first layer of light guide plate body 1001, a lower surface of the first layer of light guide plate body 1001 being just the bottom surface 102 of the light guide plate.

It is to be noted that, in Step S03, the first material is a transparent, hot-melt resin used for the light guide plate body 100, e.g., PMMA or PC. In addition, in this step, the 3D printer may be a hot-melt 3D printer, in which a hot-melting unit and the nozzles are maintained at a temperature sufficient to keep the resin in a molten state. Preferably, a heating chamber and the first nozzle of the 3D printer have a maximum temperature not less than 350° C., so as to meet a hot-melting and machining temperature for PMMA or PC. In addition, the accuracy of lamination (i.e., a thickness of each layer) for the 3D printer is between 0.1 μm and 10 μm.

Step S04: according to the 3D model and the series of slices, jetting a second material using a second nozzle of the 3D printer, and accumulating the second material on an upper surface of the first layer of light guide plate body 1001 to form a first layer of dots 202, the first layer of dots 202 including a plurality of dots distributed in an array form.

It is to be noted that, in Step S04, the second, hot-melt material from the second nozzle is used to form the first layer of dots. The second material may be a transparent, translucent or white hot-melt resin material, or a hot-melt resin material mixed with the other optical particles, e.g., PMMA mixed with $TiO_2$ particles. Because the second material forming the dots 200 includes a component having a refractive index different from the light guide plate body, it is able to destroy the total reflection of the light in the light guide plate, thereby to scatter the light away from the front of the light guide plate.

Step S05: according to the 3D model and the series of slices, jetting the first material using the first nozzle of the 3D printer so as to cover gaps among the dots distributed in the first layer of dots 202 in an array form, and accumulating the first material to form a second layer of light guide plate body 1002.

Step S06: according to Step S04 and Step S05, performing the printing layer by layer from the bottom up, so as to obtain the light guide plate having the layers of light guide plate bodies and the layers of dots as shown in FIG. 3, the layers of light guide plate bodies being adhered during the printing so as to form the light guide plate body 100 of the light guide plate.

Second Embodiment

The method of this embodiment may be used to manufacture the light guide plate according to the above second embodiment of the present invention.

Figure 7:
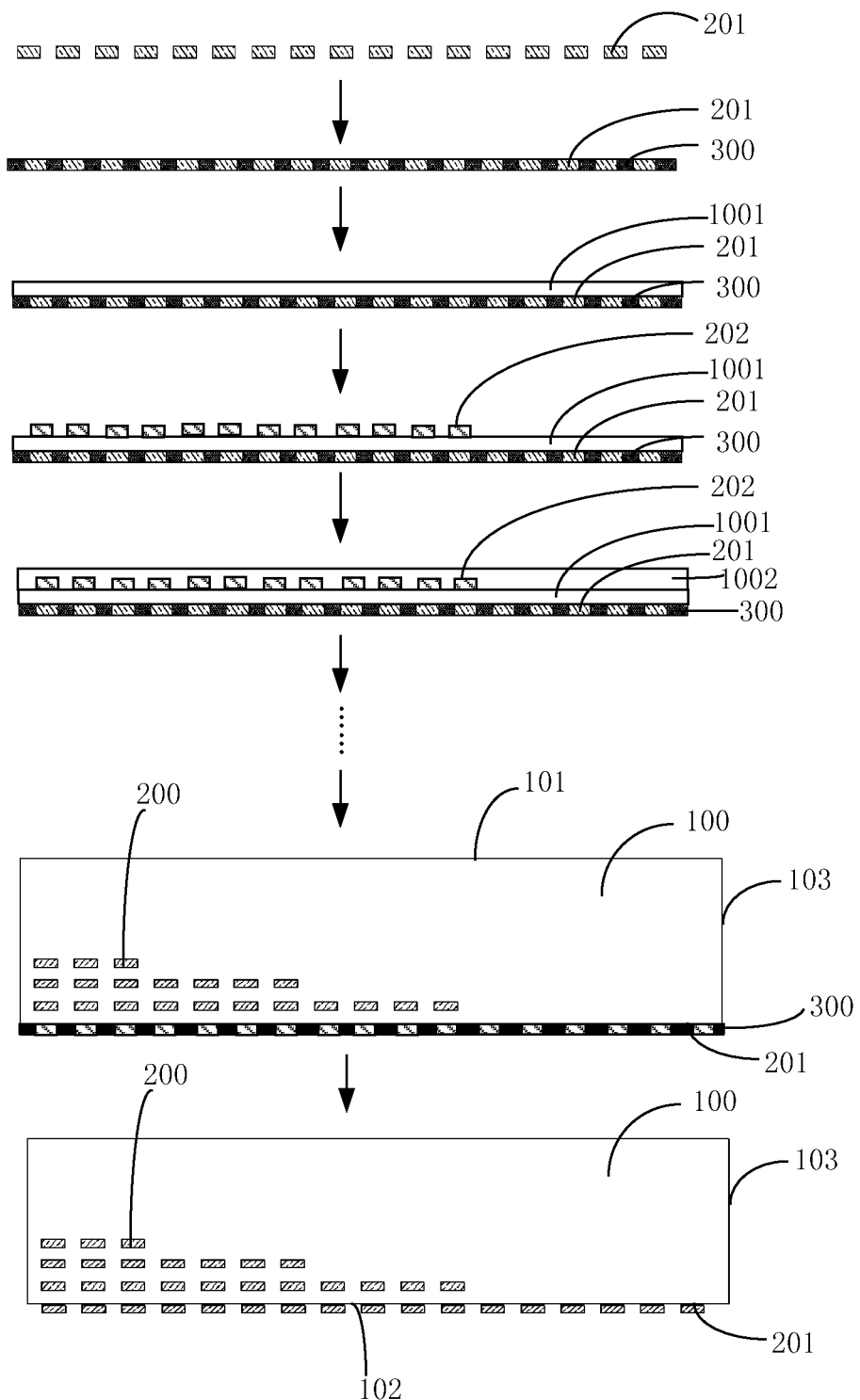
FIG. 7 is a flowchart of the method for manufacturing the light guide plate according to the second embodiment of the present invention.

To be specific, referring to FIGS. 4 and 7, the method includes the following steps.

Step S11: according to the structure of the light guide plate, generating the 3D model using a computer.

It is to be noted that, in Step S11, the structure of the light guide plate, including a 3D size of the entire light guide plate, the structure of each layer of light guide plate body and the structure of each layer of dots, is determined in the 3D model.

Step S12: decomposing the 3D model into a series of slices layer by layer from the bottom up.

It is to be noted that, in Step S02, the series of slices are used to instruct the 3D printer to accumulate the material layer by layer during the printing.

Step S13: according to the 3D model and the series of slices, jetting a second material on the support table using a second nozzle of the 3D printer, and accumulating the second material to form a first layer of dots 201, the first layer of dots 201 including a plurality of dots 200 distributed in an array form.

Step S14: jetting a third material at the gaps among the dots 200 of the first layer of dots 201 using a third nozzle of the 3D printer, and accumulating the third material to form a support layer 300 having an identical thickness to the first layer of dots 201.

It is to be noted that, in Step S14, the third material may be a removable material, e.g., paraffin (with a melting point of 54 to 56□), which may be removed with hot water.

Step S15: according to the 3D model and the series of slices, jetting a first material using a first nozzle of the 3D printer, and accumulating the first material on an upper surface of a substrate formed by the first layer of dots 201 and the support layer 300 to form a first layer of light guide plate body 1001, a lower surface of the first layer of light guide plate body 1001 being just the bottom surface 102 of the light guide plate.

It is to be noted that, in Step S15, the first material may be a transparent, hot-melt resin used for the light guide plate body 100, e.g., PMMA or PC.

Step S16: according to the 3D model and the series of slices, jetting the second material using the second nozzle of the 3D printer, and accumulating the second material on an upper surface of the first layer of light guide plate body 1001 to form a second layer of dots 202, the second layer of dots 202 including a plurality of dots distributed in an array form.

Step S17: according to the 3D model and the series of slices, jetting the first material using the first nozzle of the 3D printer so as to cover the gaps among the dots distributed in the second layer of dots 202 in an array form, and accumulating the first material to form a second layer of light guide plate body 1002.

Step S18: repeating Step S16 and Step S17, and performing the printing layer by layer from the bottom up, so as to obtain the light guide plate including the layers of light guide plate bodies and the layers of dots as shown in FIG. 4, the layers of light guide plate bodies being adhered so as to form the light guide plate body 100 of the light guide plate.

Step S19: removing the support layer 300.

It is to be noted that, when the third material is paraffin, in Step S19, the support layer 300 may be heated and melted with hot water, and then rinsed so as to remove it.

Third Embodiment

The method of this embodiment may be used to manufacture the light guide plate according to the above third embodiment of the present invention.

Figure 8:
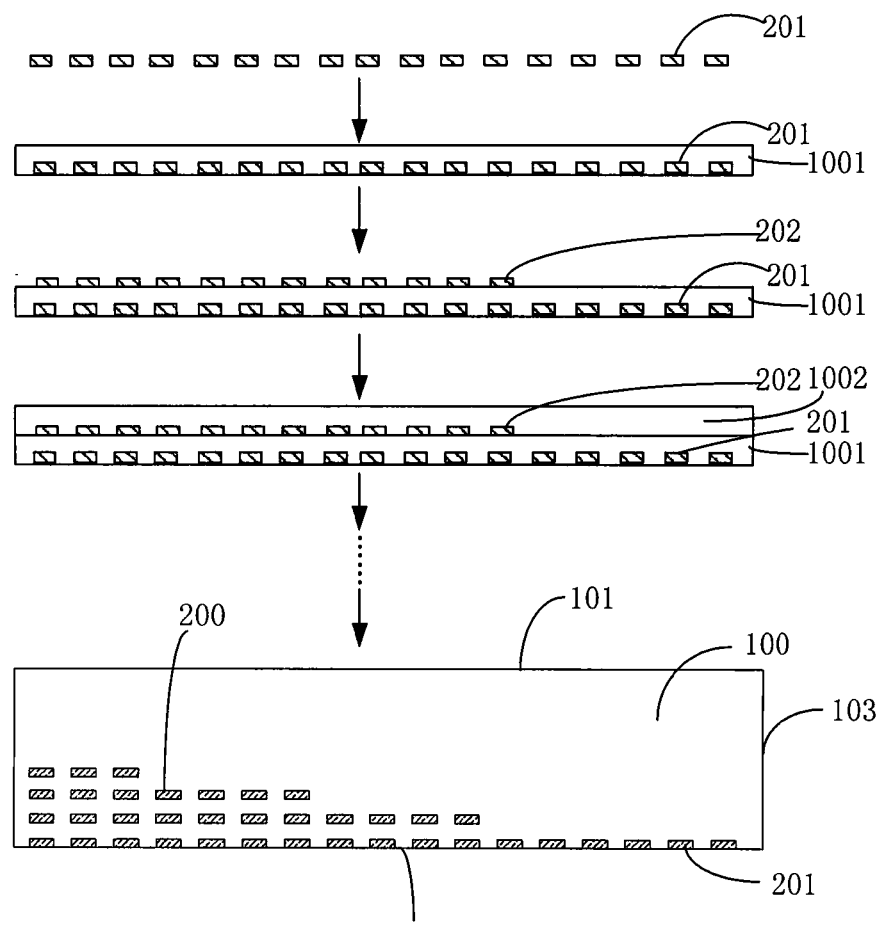
FIG. 8 is a flow chart of the method for manufacturing the light guide plate according to the third embodiment of the present invention.

To be specific, referring to FIGS. 5 and 8, the method includes the following steps.

Step S21: according to the structure of the light guide plate, generating the 3D model using a computer.

It is to be noted that, in Step S21, the structure of the light guide plate, including a 3D size of the entire light guide plate, the structure of each layer of light guide plate body and the structure of each layer of dots, is determined in the 3D model.

Step S22: decomposing the 3D model into a series of slices layer by layer from the bottom up.

It is to be noted that, in Step S02, the series of slices are used to instruct the 3D printer to accumulate a material layer by layer during the printing.

Step S23: according to the 3D model and the series of slices, jetting a second material on the support table using a second nozzle of the 3D printer, and accumulating the second material to form a first layer of dots 201, the first layer of dots 201 including a plurality of dots distributed in an array form.

Step S24: according to the 3D model and the series of slices, jetting a first material using a first nozzle of the 3D printer so as to cover the gaps among the dots 200 of the first layer of dots 201, and accumulating the first material above the first layer of dots 201 to form a first layer of light guide plate body 1001, the lower surface of the first layer of light guide plate body 1001 being just the bottom surface 102 of the light guide plate.

Step S25: according to the 3D model and the series of slices, jetting the second material using the second nozzle of the 3D printer, and accumulating the second material on the upper surface of the first layer of light guide plate body 1001 to form a second layer of dots 202, the second layer of dots 202 including a plurality of dots distributed in an array form.

Step S26: according to the 3D model and the series of slices, jetting the first material using the first nozzle of the 3D printer so as to cover the gaps among the dots distributed in the second layer of dots in an array form, and accumulating the first material to form the second layer of light guide plate body 1002.

Step S27: repeating Step S25 and Step S26, and performing the printing layer by layer from the bottom up, so as to obtain the light guide plate including the layers of light guide plate bodies and the layers of dots as shown in FIG. 5, the layers of light guide plate bodies being adhered to form the light guide plate body 100 of the light guide plate.

In yet another aspect, the present invention provides a backlight module including the above-mentioned light guide plate, and a display device including the above-mentioned light guide plate.

The above are merely the preferred embodiments of the present invention. It should be appreciated that, a person skilled in the art may make further improvements and modifications without departing from the principle of the present invention, and these improvements and modifications shall also be considered as the scope of the present invention.

What is claimed is:

1. A light guide plate, comprising a light guide plate body having a light-exiting surface, a bottom surface opposite to the light-exiting surface, and a light-entering surface adjacent to the light-exiting surface and the bottom surface, wherein at least three layers of dots having a refractive index different from the light guide plate body are distributed on the light guide plate body, each layer of dots being located in a respective plane, and
  wherein among all of the at least three layers of dots distributed on the light guide plate body, the number of dots in any one layer is greater than the number of dots in any other layer that is closer to the light-exiting surface of the light guide plate body than the one layer,
  wherein among all of the at least three layers of dots distributed on the light guide plate body, an area of the dots in any one layer is greater than an area of the dots in any other layer that is closer to the light-exiting surface than the one layer,
  wherein all of the dots of the one layer are distributed at an equal interval and all of the dots of the other layer are distributed at the equal interval,
  wherein in each layer of dots, the dot arranged farthest from the light-entering surface is aligned with the dots arranged farthest from the light-entering surface in the other layers, and
  wherein the area of any one dot is greater than the area of any other dot that is closer to the light-entering surface than the one dot.

2. The light guide plate according to claim 1, wherein the respective plane on which each layer of dots is located is parallel to the light-exiting surface of the light guide plate body.

3. The light guide plate according to claim 1, wherein the number of the dots gradually increases from a side close to the light-entering surface to a side away from the light-entering surface.

4. The light guide plate according to claim 1, wherein the number of the dots gradually increases from a side close to the light-exiting surface to a side close to the bottom surface.

5. The light guide plate according to claim 3, wherein the number of the dots gradually increases from a side close to the light-exiting surface to a side close to the bottom surface.

6. The light guide plate according to claim 1, wherein a projection of the at least three layers of dots onto the bottom surface covers the entire bottom surface.

7. The light guide plate according to claim 1, wherein the at least three layers of dots are arranged separately inside the light guide plate body, or
  at least one layer of the at least three layers of dots is distributed on the bottom surface of the light guide plate body.

8. The light guide plate according to claim 7, wherein at least one layer of dots distributed on the bottom surface of the light guide plate body comprises concave dots or convex dots.

9. A backlight module comprising the light guide plate according to claim 1.

10. A light guide plate, comprising:
  a light guide plate body having a light-exiting surface, a bottom surface opposite to the light-exiting surface, and a light-entering surface adjacent to the light-exiting surface and the bottom surface; and
  at least three layers of dots having a refractive index different from the light guide plate body and distributed on the light guide plate body, wherein for all of the at least three layers of dots distributed on the light guide plate body, the number of dots per layer decreases in a direction from the bottom surface to the light-exiting surface,
  wherein among all of the at least three layers of dots distributed on the light guide plate body, an area of the dots in any one layer is greater than an area of the dots in any other layer that is closer to the light-exiting surface than the one layer,
  wherein all of the dots of the one layer are distributed at an equal interval and all of the dots of the other layer are distributed at the equal interval,
  wherein in each layer of dots, the dot arranged farthest from the light-entering surface is aligned with the dots arranged farthest from the light-entering surface in the other layers, and
  wherein each layer of the at least three layers of dots is located in a respective plane that is parallel to the light-exiting surface of the light guide plate body, and gaps between the dots of different layers of adjacent ones of the layers are distributed in a staggered manner such that a projection of the at least three layers of dots onto the bottom surface covers the entire bottom surface.

11. The light guide plate according to claimer 10, wherein:
- the at least three layers of dots includes a first layer having a first number of dots, a second layer having a second number of dots that is less than the first number of dots, a third layer having a third number of dots that is less than the first and second numbers of dots, and a fourth layer having a fourth number of dots that is less than the first, second, and third numbers of dots;
- the second layer of dots is located closer to the light-exiting surface relative to the first layer of dots;
- the third layer of dots is located closer to the light-exiting surface relative to the second layer of dots; and
- the fourth layer of dots is located closer to the light-exiting surface relative to the third layer of dots.

12. The light guide plate according to claimer 10, wherein at least one layer of the at least three layers of dots has more dots located closer to a side opposite the light-entering surface than the light-entering surface.

13. The light guide plate according to claimer 10, wherein at least one layer of the at least three layers of dots is distributed on the bottom surface of the light guide plate body and has a greater number of dots than any other layer of dots distributed on the light guide plate body.

\* \* \* \* \*